W. F. GOODWIN.
Harvester Rake.
No. 64,520.
Patented May 7, 1867.
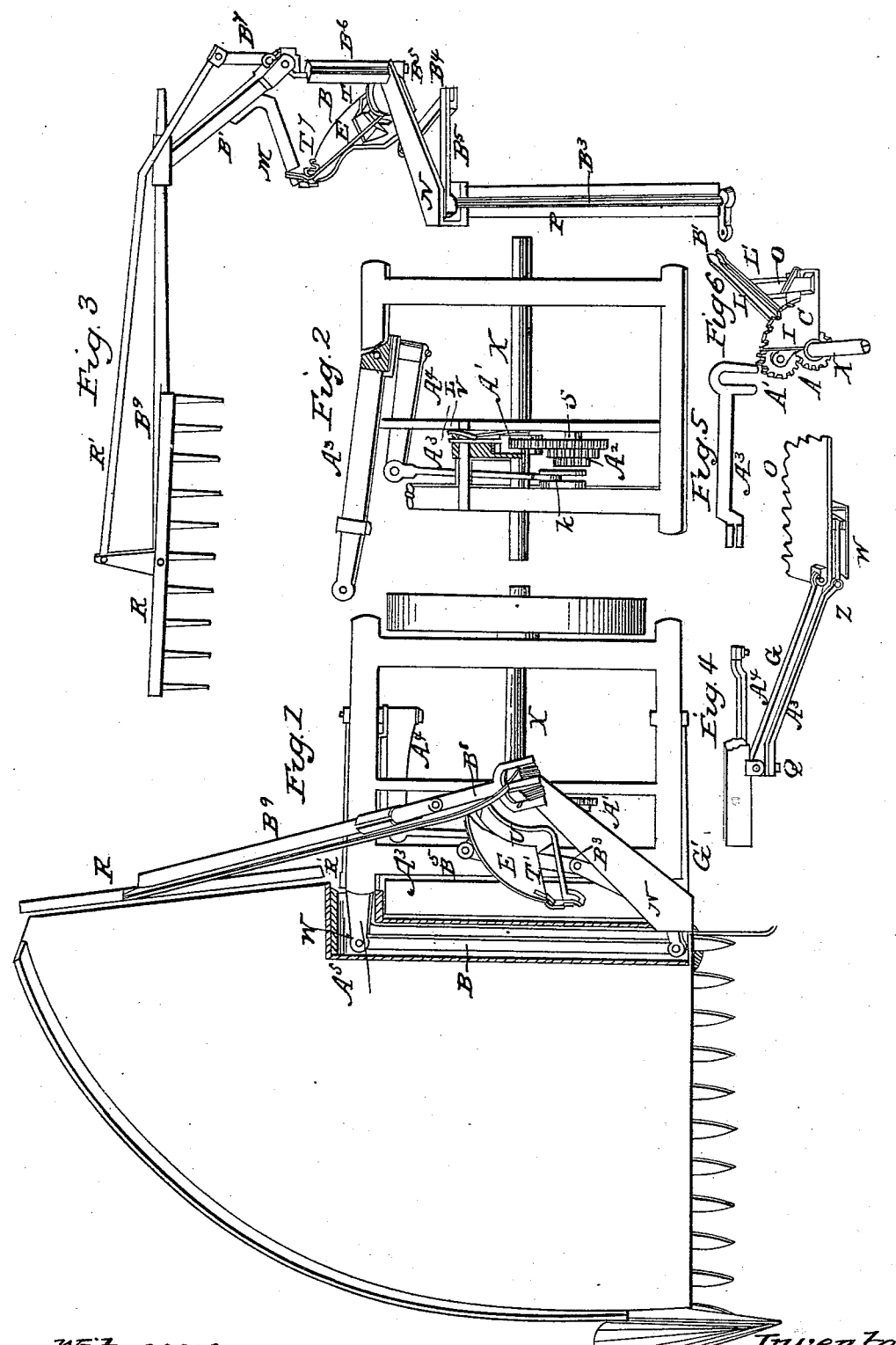

United States Patent Office.

WILLIAM F. GOODWIN, OF WASHINGTON, DISTRICT OF COLUMBIA.

*Letters Patent No. 64,520, dated May 7, 1867.*

---

IMPROVEMENT IN HARVESTER-RAKES.

---

*The Schedule referred to in these Letters Patent and making part of the same.*

---

TO ALL WHOM IT MAY CONCERN:

Be it known that I, WILLIAM F. GOODWIN, of the city and county of Washington, and District of Columbia, have invented certain new and useful improvements in the Mechanism for Operating the Rake for Harvesters; and I do hereby declare the following to be a full, clear, and exact description of the construction and operation of the same, reference being had to the accompanying drawings, which are made part of this specification, and in which—

Figure 1 is a plan of a harvester embodying my improvements, showing the position of the rake, having finished its effective stroke, and also showing a top view of the apparatus, and the manner of its attachment to the machine.

Figure 2 is a detached view of the frame and axle, having the driving apparatus of the rake attached to them, and representing the corner of the frame cut away, showing a top view of the apparatus, which is attached to the frame of a harvester.

Figure 3 is a front view of the apparatus, which is attached to and stands on the corner of the platform, showing a section through the hollow post P, and representing the rake in its elevated position.

Figure 4 is a detached view of the vibrating arms $A^4$ and $A^5$, and the connecting-bar G, looking from the rear of the machine.

Figure 5 is a detached view of the bar $A^3$, showing a side view.

Figure 6 is a detached view of the gear-wheels A and $A^1$, and block C, bar O, levers L and $L^1$.

Letters A, $A^1$, $A^2$, $A^3$, $A^4$, and $A^5$, indicate the apparatus attached to the frame and axle of the machine, and by which motion is communicated to the parts of the apparatus which are attached to and vibrate with the platform.

Letters B, $B^1$, $B^2$, $B^3$, $B^4$, $B^5$, $B^6$, $B^7$, and $B^8$ indicate the apparatus attached to and standing on the platform, and by which the forward and backward motion is communicated to the rake.

Letters E, T, $T^1$, and M indicate the circular inclined plane, and the switches and projecting arm, which serve to elevate and depress the rake.

Similar letters of reference indicate corresponding parts in the several figures.

This improvement relates to mechanism for operating harvester-rakes which admits of being readily attached to different varieties of reaping machines, which is of simple construction, and believed to be practicable and efficient in operation.

To enable other skilled in the art to which my invention appertains to fully understand and use the same, I will proceed to describe it, in connection with the accompanying drawings.

The machine represented in the drawing has a hinged vibrating platform, the cutter-bar being operated in front of the driving-wheels. The platform is of a quadrant shape, the outside being made circular, the centre of the circle being situated between the driving-wheels at a point nearly over the axle, and about two-fifths of the distance between the driving-wheels, from the wheel next to the platform, which brings it near the centre of the frame. By placing the fulcrum on which the rake swings between the driving-wheels, a circle is obtained sufficiently large to permit the rake to sweep over the platform from front to rear, thus sweeping the grain back past the driving-wheel, and delivering it on the ground at the side of the platform in rear of the driving-wheels, in gavels sufficiently large to form a sheaf. As this application has exclusive reference to the devices by which the rake is operated, I will limit the description to such devices, and refer to parts of the reaping apparatus only by way of elucidation.

A is a small cog-wheel placed on the axle $x$, and turns with the same; the axle is provided with a groove, cut lengthwise, into which is fitted a tongue or key projecting inward from the inner circumference of the wheel A, which serves to turn the wheel with the axle. The tongue is made to fit loosely in the groove, so as to permit the wheel to be shifted on the axle to suit the different gears on the shaft S, which change the movements of the rake, causing it to move faster or slower, making smaller or larger sheaves, as may be desired. L is a lever, pivoted on the axle, having its jaws one on each side of the wheel A, and serves to move the wheel lengthwise on the axle, and to hold it in its proper position. $A^1$ is a gear-wheel placed between the projecting jaws of the lever L, in gear with the wheel A, having its journals in the jaws of the lever. The lever being pivoted to the axle, serves to throw the wheel $A^1$ in and out of gear with the gear-wheels marked $A^2$ on the crank-shaft S. C is a block made to slide on the bar O, having jaws on its end, which are fitted over the lever L, and serve to hold the lever and the wheel A in position on the axle. I is a flange, of quadrant shape, projecting upward from one side of the block C, and standing close to the lever L, having notches cut in its circular edge, which form receptacles for the end of the small lever $L^1$, which serves to hold the lever L in position, holding the wheel $A^1$ in or out of gear with the wheels $A^2$ on the crank-shaft S. $A^2$ is a cone of gear-wheels, of different diameters, placed on the shaft S, in a position to permit the wheel $A^1$ to be thrown in gear with either of the gear-wheels $A^2$, which serve to change the movements of the rake. S is a crank-shaft, placed in the frame in a position parallel with the axle $x$. The wheels $A^2$ are fastened on the shaft S, and serve to turn it, thereby turning the crank K, which is also fastened to the shaft, and serves to operate the bar $A^3$. $A^3$ is a bar, having a yoke on one end, which is fitted over the wrist of the crank K, and a vibrating joint at the other, attached to the end of the vibrating arm $A^4$. When the crank is turning, the wrist working in the yoke causes the bar $A^3$ to move forward and backward, moving the swinging end of the vibrating arm $A^4$ with it. $A^4$ is pivoted on a stud projecting from the end of the arm $A^5$, and serves to operate the arm $A^5$, causing it to swing on its pivot Q, on the end of the connecting-bar G. $A^5$ is a vibrating arm, having at its upper end a stud, V, the axis of which is in line with the hinge-joints of the connecting-bars G and $G^1$ which attach the platform to the frame of the machine. The upper end of the arm $A^5$ is pivoted to the upper end of the bar G on the under side, and vibrates up and down with the bar G swinging on the same joint. The stud V, on the end of the arm $A^5$, turns in the end of the arm $A^4$, permitting the arm $A^5$ to vibrate up and down with the bar G swinging on the same joint, in conforming to the vibrating movements of the platform in passing over rough ground, and permitting the platform to be raised and lowered, without interfering with the movements of the rake. The lower end of the arm $A^5$ extends under the platform, having a hinged joint, Z, at the edge of the platform, which allows it to vibrate. The extreme end of the arm extending under the platform is attached to the bar B by a hinge-joint, which permits the end of the arm $A^5$ and bar B to move forward and backward under the platform in the box W. B is a bar, extending from the front of the platform to the rear of the driving-wheel, having its forward end attached by a hinge-joint to the swinging end of the crank-arm $B^1$, and its after end attached to the arm $A^5$, serving as a connecting-bar between the arm $A^5$ and crank-arm $B^1$, and serves to operate the upright shaft $B^2$. $B^2$ is a shaft standing upright in the hollow post P, having on its lower end the crank-arm $B^1$, and on its top end the crank-arm $B^3$. The swinging end of the crank-arm $B^3$ is connected by a hinge-joint to the link $B^4$. The link $B^4$ is attached to the crank-arm $B^3$ at one end, and to the swinging end of the crank-arm $B^5$ at its other end, by hinge-joints, and serves as a connecting-link between the crank-arms $B^3$ and $B^5$. The crank-arm $B^5$ is fastened on the lower end of the short shaft $B^6$. $B^6$ is a shaft standing upright in the hollow post $P^1$, on the end of the projecting arm N, having the crank-arm $B^5$ attached to its lower end, and carrying on its top end the post $B^7$ and arm $B^8$. The post $B^7$ is a projection extending upward from the cross-head on the end of the shaft $B^6$, and serves as a means of attachment for the end of the rod $R^1$. $B^8$ is a vibrating arm, hinged to the cross-head on the end of the shaft $B^6$, and serves to carry the rake. $B^9$ is the rake-handle, having its upper end inserted in the end of the arm $B^8$, and its lower end hinged to the rake-head R. $R^1$ is a rod, hinged at one end to the post $B^7$, and at the other end to the projection $R^2$ on the rake-head, and serves to turn the rake on its pivot on the end of the handle $B^9$, thus maintaining the rake in a parallel position with the platform in all its movements. P is a hollow post, standing on the corner of the platform, and serves as a support for the shaft $B^2$ and projecting arm N, and may also support the reel. N is an arm, fastened at one end to the top of the post P, and projects outward over the inside driving-wheel, and backward toward the centre of the frame, supporting on its projecting end the hollow post $P^1$. The arm M also supports the inclined plane E, with its switches T and $T^1$. E is a circular inclined plane, which serves as a track for the roller on the end of the arm M to travel on; the roller rolls up the track when the rake is making its forward movement, thus elevating the rake. T is a switch, which opens and permits the roller on the end of the arm M to pass out of the groove from behind it, and is thrown back by a spring into its place in front of the roller, forming a bridge over the opening or groove U, out of which the roller passes in its backward movement, and serves to carry the roller on to the inclined track E. $T^1$ is a switch at the top of the inclined track, which serves as a bridge to carry the roller over the opening Y, in the top of the track E. When the roller has passed over the opening, the switch is thrown up by a spring, and serves to force the roller down through the opening Y into the groove U. The groove U serves to hold the roller in its proper position, which prevents the rake from dragging on the platform, and also holds it down into the grain while making its effective stroke.

Having thus described in detail the different parts of the apparatus and their uses, I will proceed to describe the operation of the same, in connection with each other, when the machine is in motion.

When the machine moves forward, turning the axle forward, which turns the wheel A with it, the wheel A being in gear with the wheel $A^1$, causes the wheel $A^1$ to turn backward. The wheel $A^1$ being in gear with one of the wheels $A^2$ on the shaft S, causes the shaft S to turn forward, turning the crank K forward, moving its wrist toward the front of the machine. The wrist working in the yoke on the end of the bar $A^3$, draws the bar forward. The rear end of the bar $A^3$ being attached to the swinging end of the arm $A^4$, draws the arm forward. The arm $A^4$ being attached to the stud on the end of the arm $A^5$, causes the arm $A^5$ to swing on its pivot Q, moving its outer swinging end forward toward the front of the platform, and forcing the bar B forward with it. The bar B moves the swinging end of the crank $B^1$ forward, turning the shaft $B^2$ in the hollow post P, which causes the swinging end of the crank-arm $B^3$ to move backward, which moves the link $B^4$, which also moves the swinging end of the crank-arm $B^5$ backward, turning the shaft $B^6$ in the post $P^1$; the arm $B^8$, being hinged to the cross-head on the top of the shaft $B^6$, turns with the shaft, and the rake being supported and operated by the arm B³, moves back over the platform, making its effective stroke. When the rake has finished its effective stroke, having swept the grain from the platform, the crank K turns toward the rear of the machine, reversing the motion of the apparatus, the rake moves forward, the switch T having closed the groove U. The roller on the end of the projection M rolls up the inclined track E, thus elevating the rake while making its forward movement, or ineffective stroke. When the roller has crossed the opening Y, it rolls forward sufficiently far to rest on the end of the track, which holds up the rake till the movement is reversed. When the rake starts to make its effective stroke, the roller rolls off the end of the track, and falls down through the opening Y, permitting the rake to descend to the platform, and the roller passes into the groove U, and holds the rake down into the grain while making its effective stroke.

Having thus described my invention, what I claim as new, and desire to secure by Letters Patent, is—

1. The jointed lever, consisting of arms $A^4$ and $A^5$, for communicating motion from gearing on the main frame to a rake mounted on the hinged finger-bar or platform, arranged and operating substantially as described.

2. The reciprocating bar B, arranged in the described relation to the grain-platform, in combination with the vibrating arm $A^5$, and the rock-shaft $B^2$ in the hollow post P, or their equivalents, substantially as and for the purpose specified.

3. The bar $A^3$, arms $A^4$ and $A^5$, bar B, shaft $B^2$ in the hollow post P, crank-arm $B^3$, link $B^4$, crank-arm $B^5$, shaft $B^6$, post $B^7$, rod $R^1$, projection $R^2$, projecting arm M, track E, and switches T and $T^1$, combined and arranged to operate in the manner and for the purpose substantially as described.

4. The post P, having a hole made through it to receive and support the shaft $B^2$, in combination with the projecting arm N, fastened on the top of said post P, substantially as and for the purpose described.

WM. F. GOODWIN.

Witnesses:
    FRED. A. FOSTER,
    EDM. F. BROWN.